FIG. 1.

April 8, 1952     E. WILDHABER     2,591,753
ADJUSTABLE RATIO FRICTION DRIVE
Filed July 1, 1949     4 Sheets-Sheet 2

INVENTOR.
ERNEST WILDHABER
BY
ATTORNEY

April 8, 1952     E. WILDHABER     2,591,753
ADJUSTABLE RATIO FRICTION DRIVE
Filed July 1, 1949     4 Sheets-Sheet 3

INVENTOR.
ERNEST WILDHABER
BY
ATTORNEY

April 8, 1952 E. WILDHABER 2,591,753
ADJUSTABLE RATIO FRICTION DRIVE
Filed July 1, 1949 4 Sheets-Sheet 4

INVENTOR.
ERNEST WILDHABER
BY
ATTORNEY

Patented Apr. 8, 1952

2,591,753

UNITED STATES PATENT OFFICE 2,591,753

ADJUSTABLE RATIO FRICTION DRIVE

Ernest Wildhaber, Rochester, N. Y.

Application July 1, 1949, Serial No. 102,660

18 Claims. (Cl. 74—199)

The present invention relates to friction transmissions of the adjustable type in which multiple discs are employed as the friction transmitting elements and in which different speed ratios, within the design limits, may be obtained through adjustment of the center distances of mating discs. More particularly, the present invention is an improvement on the invention disclosed in my Patent No. 2,563,896 granted August 14, 1951.

In transmissions such as disclosed in my prior application mentioned, there are two sets of friction discs mounted respectively, on coaxial drive and driven shafts, and these two sets of discs contact respectively with two mating sets of friction discs that are mounted, respectively, on two axially aligned counter-shafts or sleeves. The countershafts or sleeves are parallel to the drive and driven shafts. The two countershafts or sleeves are connected by toothed face coupling members which have helical side tooth surfaces and which serve to transmit torque between the countershafts or sleeves. The countershafts or sleeves are mounted to be adjustable radially toward and from the drive and driven shafts, and for maintaining axial pressure between all the discs in any adjusted position conical pressure rollers are provided that engage internal conical end surfaces on the end discs of the countershafts. These rollers may be guided on guides inclined to the axis of the countershafts or sleeves, to force the discs axially toward one another or allow them to move axially apart, while maintaining the desired axial pressure, depending upon the direction of radial adjustment of the countershafts or sleeves.

One object of the present invention is to provide improvements in the inclined guides along which the members that maintain pressure adjust during radial adjustment of the transmission.

A further object of the invention is to provide a pressure-maintaining member that is movable, during radial adjustment of the transmission, in the plane of the shaft axes along straight guides inclined to planes perpendicular to said axes, said member comprising one or more rolling elements with which to so engage an end disc as to exert a force thereon perpendicular to said straight guides.

Another object of the invention is to provide a pressure-maintaining member of the character described embodying a single roller with two working surfaces angularly disposed to one another and adapted to engage corresponding angularly disposed surfaces on an end disc.

Another object of the invention is to provide simplified means for holding and adjusting the countershaft without resorting to a conventional slide.

A related object of the invention is to devise such simplified means with balanced load reactions so that the loads of operation have no tendency to displace the countershafts or sleeves toward the drive and driven shafts or away from them.

A further object of the invention is to provide friction discs for a drive of the character described which will have improved seating engagement with their respective shafts without requiring any increase in the distance between a pair of adjacent coaxial discs.

Another object of the invention is to provide a friction drive of the character described in which the shaft, which is radially adjustable to change the transmission ratio, is so mounted as to turn when it is radially adjusted.

Still another object of the invention is to attain maximum efficiency and minimum wear in a double stage transmission by using a second torque loader on the driven shaft in addition to that previously provided between the countershafts or sleeves.

Other objects of the invention will be apparent hereinafter from the specification and from the recital of the appended claims.

As in the case of the transmission of my prior application mentioned, the present transmission employs mating tapered friction discs which are movable axially on their shafts. In the embodiment illustrated, 20 and 21 denote, respectively, coaxial drive and driven shafts. The drive shaft 20 is formed as a hollow sleeve in which the driven shaft is journaled. It is adapted to be driven from any suitable source of power through a conventional face coupling, of which one part is shown at 22 which is integral with the shaft. Shaft 20 is journaled adjacent one end by means of ball bearing 23 in one end member 24 of the transmission casing. At its opposite end it is journaled by means of roller bearing 26 on the driven shaft 21.

Shaft 21 extends into the sleeve 20 and is journaled in said sleeve by means of a roller bearing 27 as well as bearing 26. At its opposite end the shaft is splined and has rigidly secured to it a sleeve member 28. The sleeve member 28 seats at one end against a shoulder formed on the shaft 21 and is held against axial movement relative to the shaft 21 by a washer 29 and nut 30. The sleeve member 28 is journalled in the end member 35 of the transmission casing on two spaced tapered roller bearings 36 and 37, which thus serve to carry the shaft 21.

Figure 2:
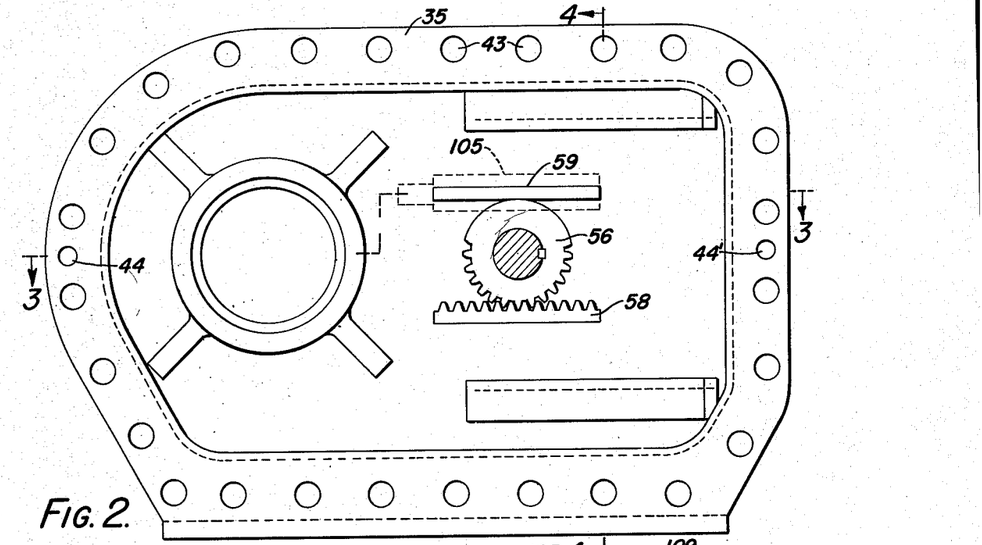
Fig. 2 is a view looking in the direction of the arrows 2—2 of Fig. 1.

The transmission casing itself is of novel construction. It comprises a middle portion 38 which is all in one piece and which completely surrounds the transmission. This middle section may be provided with ribs 39 for strength and for cooling. To this section are bolted by bolts 40 and 41 the end members 24 and 35 of the casing. The bolts pass through holes in the end members (holes 43 of end member 35 being shown in Fig. 2) and thread into holes 42 provided in middle section 38. The end members or plates 24 and 35 contain all the bores and guideways. The middle section, therefore, need not be worked (planed, milled or ground) on its inside. It needs only to be worked on its end faces against which the end plates 24 and 35 abut. The end plates are aligned and then doweled to the middle section at diametrically opposite points, the dowel-pin holes of end plate 35 being denoted 44 and 44' in Fig. 2. This structure of the transmission housing reduces cost of manufacture to a minimum and insures quick, easy assembly or disassembly of the transmission.

Journalled on a shaft or axle 45 which is parallel to shaft 21 are a pair of coaxial countershafts 46 and 47. These countershafts, which are in the form of sleeve members, are provided with disc-like projections 48 and 49 respectively, at their adjacent ends. There the countershafts are journaled on one another, as denoted at 50 and 51, so as to be rotatably and axially movable with respect to one another. There also, an anti-friction bearing 52 rotatably supports the member 47 on axle 45. At their remote ends the countershafts 46 and 47 are journaled on axle 45 by means of roller bearings 53 and 54, respectively. All three bearings 52, 53, and 54 are cylindrical bearings and permit moderate axial movement.

The axle 45 is rigidly secured at its opposite ends to a pair of cylindrical gear segments 55 and 56, respectively, which mesh with the stationary racks 57 and 58, respectively, that are secured to the end members 24 and 35, respectively. The segments may have straight spur gear teeth and the racks correspondingly will have straight teeth. In this case the axle may be held axially against whatever light loads might be encountered by guide surfaces (not shown) which contact the ends of the teeth. By providing opposite helical teeth on the gear segments 55 and 56 and corresponding oppositely inclined teeth on the racks 57 and 58 the need for such guide surfaces can be eliminated.

Figures 3, 4:
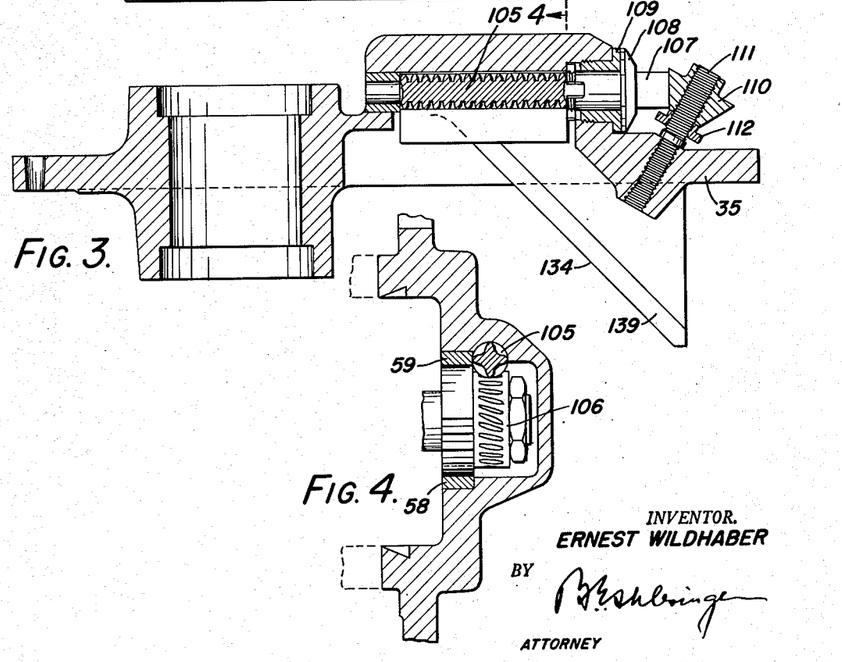
Fig. 3 is a section along the line 3—3 of Fig. 2.
Fig. 4 is a section along the line 4—4 of Fig. 2.
Figure 5:
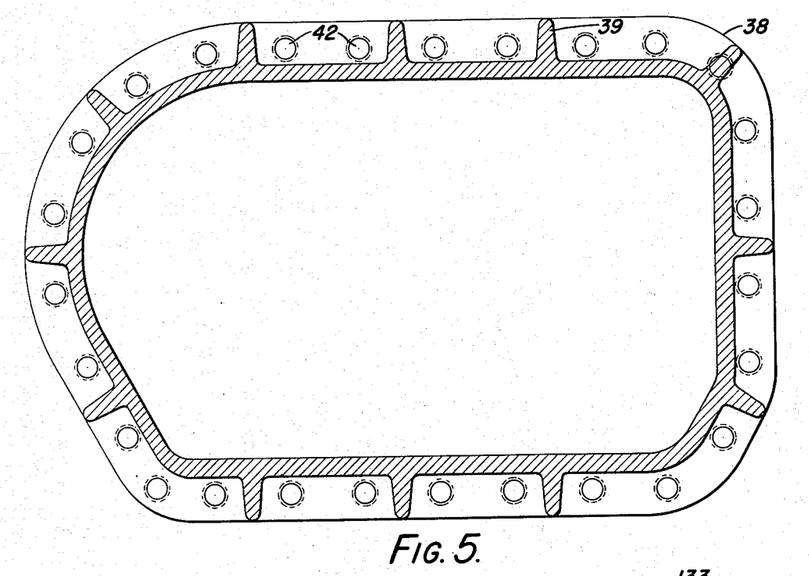
Fig. 5 is a section through the transmission housing taken on the line 5—5 of Fig. 1, looking in the direction of the arrows, the parts of the transmission itself being omitted from the view.
Figure 6:
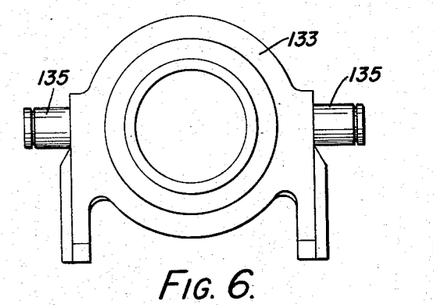
Fig. 6 is a detail view of one of the pressure-maintaining members of the transmission taken along its bearing axis.
Figure 7:
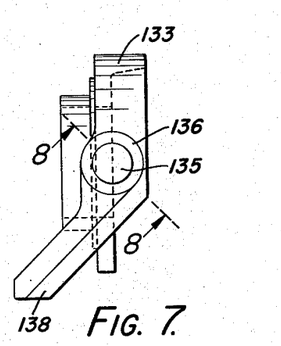
Fig. 7 is a side elevation of this member.

The teeth of the segments and racks are kept in engagement by bars 59 (Figs. 2 and 4) which have plane sides and which contact the cylindrical untoothed peripheral surfaces of the segments 55 and 56.

Mounted on the drive shaft 20 are a plurality of friction discs 60. These have splined connection with the shaft to rotate therewith but to be movable axially relative thereto. Discs 60 have conical working surfaces 61 and 61' at opposite sides and splined hubs which fit splines provided on shaft 20.

Discs 60 engage mating friction discs 65. These mating discs have splined connection with countershaft 46 so as to rotate with shaft 46 but to be movable axially relative thereon.

The discs 65 have narrow conical working strips 66 and 66' at opposite sides, which engage the conical side surfaces of discs 60, and they have splined hubs to fit splines provided on sleeve or countershaft 46.

The torque of the countershaft is transmitted through a torque loader 70 from countershaft 46 to coaxial countershaft 47. The torque loader is in the form of a face coupling comprising two members which have interengaging teeth 71 and 71', respectively, that are formed integral with and project axially from discs 48 and 49. The side surfaces of the teeth 71 and 71' are inclined to the axis of rotation of the countershafts so that a separating force is created which is proportional to the countershaft torque.

Teeth 71 and 71' may be of known design. Their side surfaces are preferably made helical surfaces or approximations thereof. The teeth may be made straight and radial or may be curved lengthwise. Whether exact helical tooth surfaces or approximations thereof be used, the tooth sides have a mean lead which depends on the number of discs 60, 65, and which may be computed in the manner indicated in my Patent No. 2,563,895, granted August 14, 1951, and in my Patent No. 2,563,896 above mentioned. Of the approximations to helical tooth sides I prefer conical tooth surfaces.

Mounted on countershaft 47 are a plurality of friction discs 75. These have splined connection with the countershaft 47 to rotate therewith but to be movable axially relative thereto. These discs have conical side surfaces 76 and 76' at opposite sides which are of relatively long axial profile and they have splined hubs which engage the splines of the countershaft.

The discs 75 frictionally engage matings discs 80 that have splined connection with a sleeve member 81 which is coaxial with driven shaft 21 and operatively connected thereto. Discs 80 rotate with sleeve member 81 and are axially movable thereon. They have opposite side surfaces 82 and 82' that are of conical but of short axial profile.

A weak spring 83 is interposed between the two opposite elements of the torque-loader 70 to keep the friction discs in engagement even when no torque is transmitted. Spring 83 surrounds the bearing portion 50 of disc 48.

Combined with torque loader 70 is an adjustment for disc wear. Threaded on the disc 48 is a ring or nut 85 which at its left end has a narrow conical surface that engages and bears against the furthermost right of the discs 60. After wear, the two members 48 and 49 of the torque loader 70 separate. This increases the backlash which is particularly objectionable in cases of frequent load reversal. The desired minimum backlash may be restored by adjusting nut 85. Through this adjustment the nut only is moved to the left away from member 49 instead of the whole member 48 which would introduce backlash.

The nut 85 has one or more longitudinal grooves 86 adapted to be engaged by a ball 87. The ball is held in a bore of a tooth projection from disc 48 and is pressed outwardly by spring 88. Engagement of the ball with groove 86 is sufficient to lock nut 85. It may be turned with force, however, with a tool which engages the fine pitch teeth 89 provided on its periphery.

On the side facing discs 75, disc member 49 has a conical working surface 90. This surface is like the side surfaces 76' of discs 75 and is of long profile length in a plane containing the axis of disc member 49. It engages a mating conical working surface 92 of relatively short profile length formed on the left hand side of a plate 93 which has an integral hub 91 that is rigidly secured to driven shaft 21.

Plate 93 has axially projecting teeth 94 formed on its right hand face. These engage mating teeth 95 formed on the left hand face of the disc-like projection 96 of sleeve 81. Plate 93 and disc 96 constitute, therefore, a face coupling connecting sleeve 81 and driven shaft 21. The side surfaces of teeth 94 and 95 are inclined to the common axis of rotation of sleeve 81 and shaft 21 and are preferably helical surfaces or approximations thereof.

The interneging teeth 94 and 95 form a torque loader 98 similar to torque loader 70. A weak spring 99 is also provided in torque loader 98 between the two elements thereof to keep the friction discs in engagement when there is no torque. This spring surrounds the projecting front hub portion of plate 93. A nut 100 is threaded on the periphery of disc 96 for wear-adjustment of the torque loader. This nut bears at its right hand end against the furthermost left of the discs 75, and operates in the same way as nut 85. It is secured in any adjusted position by a spring-pressed ball detent 101 which is mounted in disc 96 in a manner similar to the mounting of ball detent 87 in disc 48. Torque loader 98 creates an axial load proportional to the torque transmitted to the driven shaft 21.

In accordance with my present invention two torque loaders are used, one on the countershaft and the other on the driven shaft. This cuts down the friction loss to a minimum. It reduces wear, heating, and gives top efficiency.

Torque loader 70 controls the axial pressure in the discs 60, 65, while torque loader 98 controls the axial pressure in the discs 75, 80. Torque loader 70 is operated by the torque transmitted through the disc 65 with narrow working surfaces where the frictional loads are applied at a substantially constant radius at all times. Likewise, the torque loader 98 is operated by the torque transmitted through the discs 80 having narrow working surfaces.

The determination of the lead or mean lead of the inclined sides of the torque loaders will now be described. Let:

$L$ = lead or mean lead of the inclined tooth sides of the torque loader
$R$ = radius of applied load at the narrow working surfaces
$n$ = number of frictional contacts whose torque is transmitted through the torque loader
$a$ = taper of the conical working surfaces of the discs with long axial profile = 90° — cone angle
$Pa$ = total axial load exerted through a set of discs
$m$ = coefficient of friction, that is, the proportion of friction load to normal load on a surface element On a surface element which carries a normal load $p$ the friction load is then $m \cdot p$. If all the elements of the line or zone of contact had friction loads extending in the same direction, the friction loads would add together directly. They would amount to a total of $m \cdot P$, where $P$ denotes the total normal load which is:

$$P = \frac{Pa}{\cos a}$$

The total torque load $T$ at the radius $R$ would then amount to:

$$T = m \frac{Pa}{\cos a}$$

per contact.

In my prior application Serial No. 17,417 above mentioned, I have shown that this condition is not a stable one, and that large slippage might occur through a slight change in the friction coefficient. I have also demonstrated there that a suitable stable condition can be caused with practically no added loss of efficiency and no added wear. I compute the lead of the tooth surfaces of the torque loader so that the total torque load per friction contact is less than the above amount, preferably two thirds of it.

The torque load $T$ at the radius $R$ is then per friction contact:

$$T = (\tfrac{2}{3}) m \cdot \frac{Pa}{\cos a}$$

and the torque for $n$ friction contacts amounts to:

$$(\tfrac{2}{3}) m \frac{Pa}{\cos a} \cdot n \cdot R$$

The lead $L$ of the tooth sides of the torque loader are now so determined that this torque gives an axial load $Pa$. This means that the following equation has to be fulfilled:

$$Pa \cdot L = 2\pi \text{ (torque)}$$

$$L = m \cdot n (2\pi R) \frac{2}{3 \cos a}$$

With my invention the desired optimum contact can be had on both sets of discs at all settings with pressure $Pa$ adapted to the contact on each set of discs. Ordinarily different pressures $Pa$ will be used on the two sets.

$a$ is a small angle, so that $\cos a$ is practically equal to unity. The discs 65 and 80 are preferably made equal so that R is the same or substantially the same for both sets of discs. However, there are preferably more discs 80 than there are discs 65 so that $n$ is larger on torque loader 98. This gives a larger lead L on torque loader 98 and steeper tooth sides, that is, tooth sides of larger lead angle. This is clearly shown in Fig. 1.

To adjust the ratio of the drive, axle 45, which carries countershafts 46 and 47, is adjusted toward or from the common axis of the drive and driven shafts 20 and 21. Axle 45 is stationary at any one given ratio. To adjust the axle, it is rolled on the spaced racks 57 and 58. Adjustment is effected by rotation of a worm 105 (Figs. 2, 3 and 4) whose axis extends in the direction of adjustment. The worm meshes with a wormwheel 106 (Figs. 1 and 4) which is formed integral with segment 56. The worm shaft has a square end 107 (Fig. 3) and a tapered disc 108 which is graduated around its periphery. These graduations read against a zero mark on a stationary bushing 109 so as to permit accurate radial adjustment of axle 45.

If desired worm 105 may be clamped in any adjusted position by axial pressure so that disc 108 is pressed against the plane end surface of stationary bushing 109. This pressure is exerted by threading up a nut 110 which has a conical peripheral surface that bears against the plane end surface of square portion 107 of worm shaft 105. Nut 110 threads onto a threaded bolt 111 that is rigidly secured to end plate 35 of the transmission casing. A smaller nut 112 may serve as a limiting stop to prevent unduly large pressures.

In accordance with my invention the desired pressure is maintained on the mating friction discs 60 and 65 in all adjusted positions of axle 45 by a roller 115 which has two angularly disposed peripheral conical surfaces 116 and 117 that bear against mating surfaces provided on an end disc 120. The disc 120 has splined connection with countershaft or sleeve 46 to rotate therewith but to be movable axially relative thereto, like discs 65. It has a narrow conical working surface 121 on its right hand side which contacts the conical working surfaces 61 of the disc 60 which is furthermost to the left.

Figure 9:
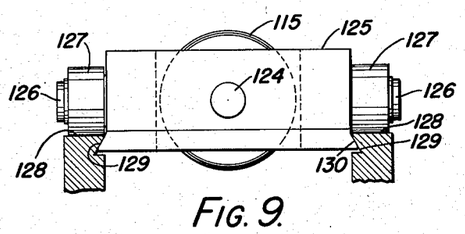
Fig. 9 is a sectional view showing the other pressure-maintaining member and its guides.

Roller 115 is mounted on anti-friction bearings 122 on a pin 124 which is secured in a holder 125. This holder has aligned pins 126 (Fig. 9) projecting from it at opposite sides whose axis is at right angles to the axis of pin 124. There is a pair of rollers 127 mounted on the pins 126. These rollers engage and roll on ways 128 that are formed on the end plate 24 of the transmission casing and that are inclined inwardly to the axis of axle 45 from a point adjacent drive shaft 20. The holder 125 also has dove-tail projections 129 which engage mating ways 130 formed on the end plate 24 and which serve to hold the rollers 127 on the ways 128 in the movement of holder 125. These dove-tail projections are merely a safeguard to keep the holder in the proper position. The load is carried by the cylindrical rollers 127.

The load is perpendicular to the ways 128 and passes through the common axis of rollers 127. This load is split up geometrically between the two surfaces 116 and 117 of roller 115, each surface taking a load normal to the surface. The larger part of the load is carried by conical surface 116 with true rolling contact. The surface 117 contacts its mating surface with rolling and some sliding contact. On the other hand, the contact between surface 117 and its mating surface is more intimate which helps the load capacity. Said mating surface may be a spherical surface centered on the axis of rotation of end disc 120 to the left of the intersection of said axis with the axis of rotation of roller 115.

The axis of rotation of roller 115 is preferably parallel to ways 128. The roller load is then perpendicular to said axis without any appreciable end thrust. Cylindrical bearings 122 may then be used for roller 115.

At the opposite end of the countershaft members, there is mounted an end disc member 130 which has a splined connection through its hub 131 with countershaft 47. Hence, like discs 75, it rotates with countershaft 47 but is free to move axially thereon.

Figure 8:
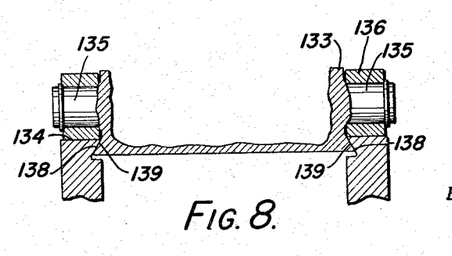
Fig. 8 is a cross-section on the line 8—8 of Fig. 7 showing this member, the rollers by which it is mounted, and the guide surfaces with which it engages.

The member 130 has a conical surface 137 on its left hand face which engages the narrow conical surface 82' of the furthermost right of the discs 80. At its opposite end member 130 carries the outer race of a tapered roller bearing 132. The inner race of this bearing is secured to a holding member 133 (Figs. 1, 6, 7 and 8) which is movable along straight guides 134 (Figs. 1 and 8) that are formed on the end plate 35 of the transmission casing and that are inclined inwardly to planes perpendicular to the axes of the friction discs.

The holding member 133 has pins 135 projecting outwardly from its opposite sides. Mounted on these pins are cylindrical rollers 136 which engage the guide surfaces 134 and which transmit the load of bearing 132 to said guides. Holder 133 has dovetail projections 138 which engage corresponding guide surfaces 139 (Figs. 3 and 8) that extend alongside guide surfaces 134. The dove-tail projections and guide surfaces merely serve to maintain the holding member in its proper upright position.

Figure 1:
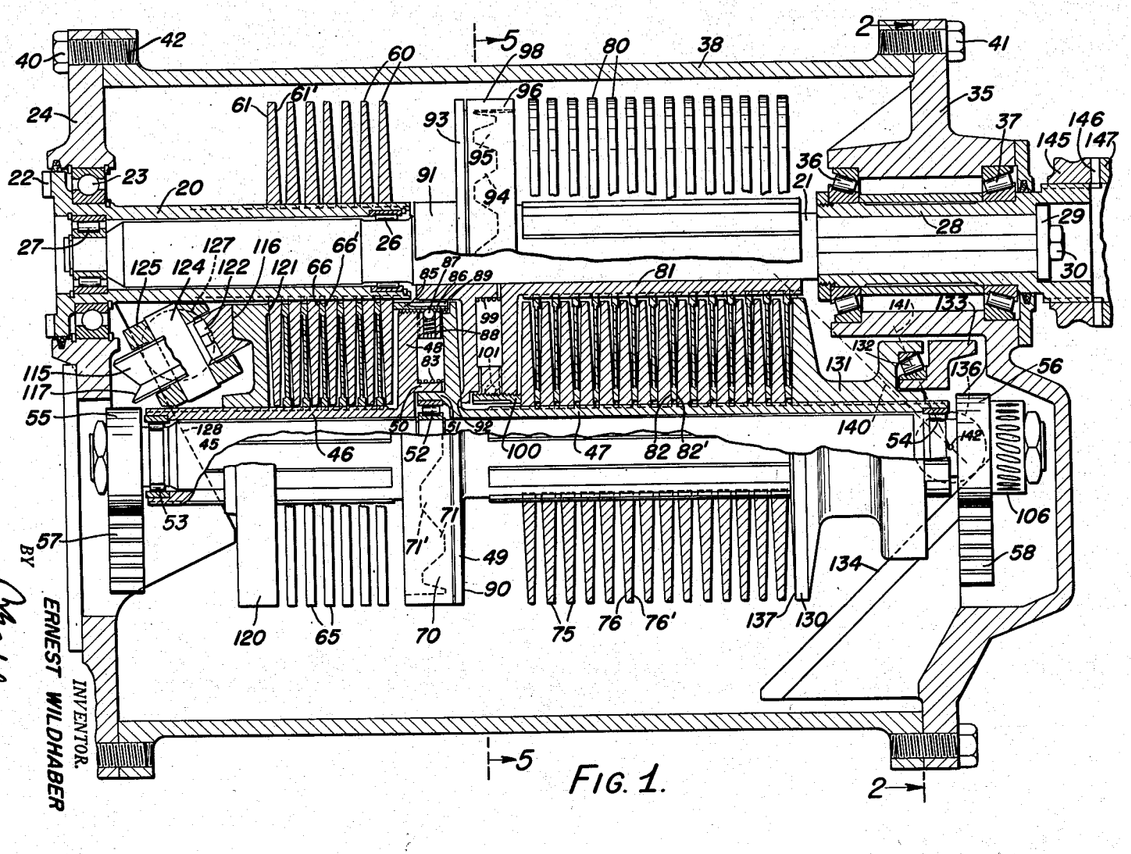
Fig. 1 is a view, partly in plan, partly in axial section, of a friction transmission made according to one embodiment of this invention, the transmission housing itself being shown in section.

The load transmitted through the tapered bearing 132 is perpendicular to the guide surfaces 134 and passes through the common axis of the rollers 136. It extends along a line 140 (Fig. 1). It is the resultant of the axial thrust $Pa$ and a radical reaction exerted on member 130 by member 47 through its splined hub.

According to my invention this reaction should be centered at a point inside of the ends of the hub 131 regardless of the radius at which member 130 contacts with its mating friction disc 80, that is, at all radical settings of the transmission. In this way cocking moments are avoided which would tend to tilt member 130 on its splined seat. This condition is fulfilled when line 140 extended lies outside of the periphery of the conical surface 137 of member 130, that is, when line 140 intersects the left hand side surface 137 of member 130 in a point which is further away from the axis of rotation of said member than the outside radius of conical surface 137. It means that the point 142, which is on the axis of rollers 136, has to be at a substantial distance from conical surface 137.

Space may be saved by putting the outer race of bearing 132 on member 130 while member 133 carries the inner race. The combined radial and thrust load which bearing 132 can carry passes through the apex 142 of a cone described by rotating a line 141 about the bearing axis. Line 141 is perpendicular to the axis of a roller of bearing 132 and intersects said axis about midway between the ends of the roller. The load line 140 should be inside of said cone.

If holder 133 carried the outer race, the characteristic cone would be reversed, that is, it would extend from apex 142 axially in the opposite direction. This would necessitate a larger axial distance of the bearing from conical surface 137 for comparable rigidity of mounting.

I shall now describe how to compute the inclination $i'$ or $i''$ of the guide ways 128 and 134 to planes perpendicular to the axes of the friction discs. Preferably the taper $a$ of the friction discs is the same on all the discs; and it is to such a case that my description applies specifically.

Let $n'$ denote the number of frictional contacts to the left of axially fixed plate 93, and $n''$ the number of frictional contacts to the right of plate 93.

$n'$ equals twice the number of discs 60 plus one. That one contact is the contact of working surface 90 of disc 49 of countershaft 47 with narrow conical surface 92 of plate 93.

$n''$ equals twice the number of discs 80 plus one. That one contact is the contact of surface 137 of member 130 with mating surface 82' of mating disc 80.

The inclinations $i'$, $i''$ should be so determined that upon radial adjustment the end discs are moved axially just so much as is required to keep all the discs in engagement without any further axial movement. In other words, the inclinations $i'$, $i''$ should be equivalent to the cumulative taper of the frictional engagements.

Per radial displacement of the countershaft of one (inch) the axial displacement of end disc 120 should amount to:

$$n' \cdot \tan a \text{ (inches)}$$

This is accomplished by lateral displacement of the roller 115 of $$\tan i' \text{ (inches)}$$

Hence:

$$\tan i' = n' \cdot \tan a$$

Likewise:

$$\tan i'' = n'' \cdot \tan a$$

When these relations are observed the discs will be maintained in contact with the same minimum backlash at all radial positions of the countershafts. Moreover, the radial loads are exactly balanced; the operating loads have no tendency to displace the countershaft; the countershaft is easily held in position; and it becomes possible to change the ratio in operation even under load without incurring major difficulties.

On account of their narrow seats on the splined hubs it is difficult to shift the friction discs axially without also rotating them. Hench the adjustment for ratio, which requires axial shift of the discs to maintain contact between mating friction surfaces, should be made while the shafts of the transmission are turning. The discs do not have to transmit load during the radial adjustment but they should turn.

To facilitate adjustment of the ratio, I provide a shift coupling at the output end of the transmission. This coupling comprises a sleeve 145 which is axially movable along splines formed on the enlarged right hand end of sleeve 28. At its right hand end sleeve 145 is connected through a toothed face coupling 146 with a member 147 that transmits the power to the apparatus which is driven by the transmission. When the ratio is to be adjusted, before operation, the sleeve 145 is shifted to the left to disengage face coupling 146. In this position, the transmission may be rotated without moving the power consumer and drag on the parts of the transmission may be reduced during adjustment.

As the ratio is changed, roller 115 and its holder 125 are carried along radially with the countershafts through the contacts of its surfaces 116 and 117 with end disc 120. No further constraint is necessary. Likewise holder 133 is carried along radially with the countershaft through its multiple contact with the rollers of bearing 132.

Preferably more discs 75 are provided than discs 65 to obtain more even stress and balanced wear. That means the number of contacts $n''$ is preferably made larger than $n'$. The resultant inclination $i''$ of guideways 134 is then larger than the inclination of guideways 128.

With large inclinations I may use a concentric bearing 132 in preference to a single roller 115. For small inclinations I prefer rollers. It should be understood, however, that I may use either a roller or a concentric bearing at either or both ends of the countershaft members.

To facilitate axial displacement of the friction discs on the sleeves with which they have splined connection, I prefer to use friction discs such as shown in Figs. 10 to 14.

Figure 10:
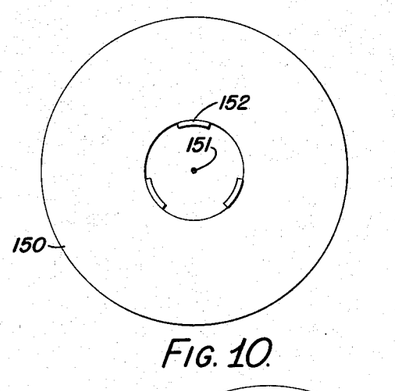
Fig. 10 is a side elevation of a friction disc constructed according to one embodiment of my present invention.
Figure 11:
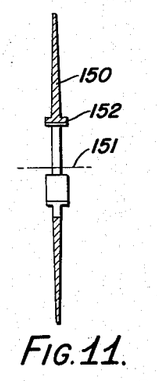
Fig. 11 is an axial section of the disc shown in Fig. 10.

Figs. 10 and 11 show a friction disc 150 which has a splined bore 151 made to fit a shaft or sleeve with six splines. Disc 150 has, however, only three splines 152; and these splines are adapted to engage in alternate spline spaces of the shaft. The splines 152 project laterally from the disc proper. Space is saved by mounting adjacent discs on their splined sleeves with the splines of the disc displaced angularly from one another so that the three splines of one disc engage in the spline ways of the sleeve not engaged by the three splines of the next adjacent disc. With this arrangement, the splines 152 may extend axially a distance nearly twice the minimum axial pitch of the discs.

Figure 12:
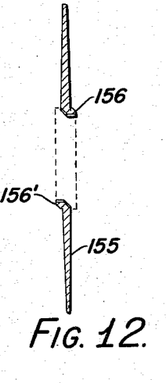
Figs. 12 and 13 are an axial section and a side elevation, respectively, of a modified form of friction disc.
Figure 13:
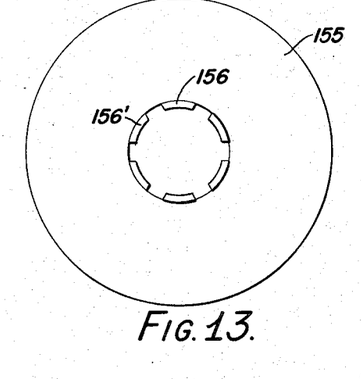

Figs. 12 and 13 show a friction disc 155 of long axial profile with six splines adapted to fit a sleeve or shaft having an equal number of splines. Each individual spline of disc 155 projects laterally only to one side of the disc but adjacent splines 156 and 156' project laterally at opposite sides of the disc. With this arrangement, also, the splines may cover an axial distance nearly twice the minimum axial distance of adjacent discs. This minimum distance is reached at the maximum radial distance of the countershafts from the drive and driven shafts.

Figure 14:
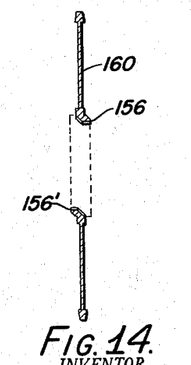
Fig. 14 is an axial section of still another form of friction disc.

Fig. 14 shows a friction disc 160 whose working surfaces are of narrow axial profile and which has the same idea of successive splines projecting laterally to opposite sides as is shown in Figs. 12 and 13. The two sets of splines are again denoted 156 and 156'.

It should be understood that friction discs, such as shown in Figs. 10 to 14 may be used in various types of friction drives and are not confined to use in transmissions such as herein described. It is furthermore to be understood that in certain aspects, such as, in the radial adjustment for ratio setting, the invention may be applied to single stage transmissions as well as to multiple stage transmissions such as herein disclosed.

It will, therefore, be understood that while the invention has been described in connection with different embodiments thereof, it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An adjustable ratio friction transmission comprising two shafts having parallel axes, interengaging sets of friction discs mounted on the two shafts, respectively, to rotate with the two shafts and to be movable axially relative thereto, a member on which one of said shafts is rotatably mounted, means for adjusting said member to adjust said one shaft toward and from the other shaft along a straight line connecting the axes of the two shafts, and means for constraining said member to rotate during said adjustment.

2. An adjustable ratio friction transmission comprising two shafts having parallel axes, interengaging sets of friction discs mounted on the two shafts, respectively, to rotate with the two shafts and to be movable axially relative thereto, a member on which one of said shafts is rotatably mounted, means for adjusting said member to adjust said one shaft toward and from the other shaft, comprising a pair of gears secured at opposite ends of said member to be coaxial with said one shaft, a pair of stationary racks which mesh with said gears, respectively, and which extend in the direction of adjustment, a toothed wheel rigidly secured to said member, and a rotatable worm whose axis extends in the direction of adjustment and which meshes with said wheel and which is held against axial movement.

3. An adjustable ratio friction drive comprising a drive shaft and a driven shaft which are coaxial, a set of friction discs mounted on each shaft to rotate therewith but to be movable axially relative thereto, a pair of coaxial countershafts parallel to the drive and driven shafts, two sets of friction discs mounted on the countershafts and adapted to contact with the discs on the drive and driven shafts, respectively, a torque-loading coupling disposed between said countershafts, a second torque-loading coupling disposed between the first torque-loading coupling and the driven shaft and mounted coaxial with the driven shaft, one element of said second torque-loading coupling being secured to the driven shaft, means for adjusting the countershafts toward and away from the drive and driven shafts, and means for maintaining pressure between the mating friction discs in all positions of adjustment of the countershafts.

4. An adjustable ratio friction drive comprising a drive shaft and a driven shaft which are coaxial, a set of friction discs mounted on each shaft to rotate therewith but to be movable axially relative thereto, a pair of coaxial countershafts parallel to the drive and driven shafts, two sets of friction discs mounted on the countershafts and adapted to contact with the discs on the drive and driven shafts, respectively, a torque-loading coupling, comprising a pair of mating face coupling members, which have side tooth surfaces inclined to their axis, disposed between said countershafts, one element of said coupling having contact with the adjacent disc of the set of discs on one countershaft, a second torque-loading coupling one element of which has contact with the other element of the first coupling and the second element of which has contact with the adjacent disc of the set of discs on the other countershaft, both elements of said second coupling having side tooth surfaces which are inclined to their axis, means for adjusting the countershafts toward and from the drive and driven shafts, and means for maintaining pressure between the mating friction discs in all positions of adjustment of the countershafts.

5. An adjustable ratio friction drive comprising a drive shaft and a driven shaft whcih are coaxial, a set of friction discs mounted on each shaft to rotate therewith but to be movable axially relative thereto, a pair of coaxial countershafts parallel to the drive and driven shafts, two sets of friction discs mounted on the countershafts and adapted to contact with the discs on the drive and driven shafts, respectively, a torque-loading coupling, comprising a pair of mating face coupling members, which have side tooth surfaces inclined to their axis, disposed between the two sets of discs on the two countershafts, one element of said coupling having contact with the adjacent disc of the set of discs on one countershaft, a second torque-loading coupling, one element of which has contact with the other element of the first coupling and the second element of which has contact with the adjacent disc of the set of discs on the other countershaft, both elements of said second coupling having side tooth surfaces which are inclined to their axis, and rotatable members for engaging the end discs of the two sets of countershaft discs opposite to the end discs which are engaged by the elements of the two torque loaders, means for adjusting the countershafts toward and from the drive and driven shafts, and means for moving the rotatable members axially on adjustment of the countershafts to maintain pressure between the discs in any adjusted position.

6. An adjustable ratio friction drive comprising a drive shaft and a driven shaft which are coaxial, a set of friction discs mounted on each shaft to rotate therewith but to be movable axially relative thereto, a pair of coaxial countershafts parallel to the drive and driven shafts, two sets of friction discs mounted on the two countershafts to rotate therewith but to be movable axially relative thereto and adapted to contact with the discs of the drive and driven shafts, respectively, a torque-loading coupling disposed between the discs of the two countershafts, means for adjusting the countershafts toward and from the drive and driven shafts, and means for moving the friction discs axially on said adjustment, said last-named means comprising a holding member at one end of one countershaft, a plurality of anti-friction rolling members interposed between said holding member and the adjacent disc of said one countershaft, a guideway inclined to the axis of the countershaft and to the direction of adjustment of the countershafts, and means on said holding member for engaging said guideway to move said member axially on adjustment of said countershafts.

7. An adjustable ratio friction transmission comprising two shafts having parallel axes, interengaging sets of tapered friction discs mounted on the two shafts, respectively, to rotate with the two shafts and to be movable axially relative thereto, a member on which one of said shafts is rotatably mounted, gear members secured to opposite ends of said member to be coaxial with said one shaft, parallel stationary racks with which said gear members mesh, means for adjusting said one shaft toward and from the other by rotating said member to cause it to roll on said racks, and means for maintaining pressure between the friction discs in all positions of adjustment.

8. An adjustable ratio friction transmission comprising two shafts having parallel axes, interengaging sets of tapered friction discs mounted on the two shafts, respectively, to rotate with the two shafts and to be movable axially relative thereto, a member on which one of said shafts is rotatably mounted, segmental gears secured to opposite ends of said member to be coaxial with said shaft, parallel stationary racks with which said gears mesh, said gears having cylindrical portions coaxial with the axis of said one shaft, a stationary way disposed opposite and parallel to each rack and engaging the cylindrical portion of each segmental gear to maintain each gear in engagement with its rack, means for adjusting said one shaft toward and from the other shaft by rotating said member to cause it to roll on said racks, and means for maintaining pressure between said discs in any adjusted position of said member.

9. An adjustable ratio friction drive comprising two shafts having parallel axes, interengaging sets of friction discs mounted on the two shafts, respectively, to rotate with the two shafts and to be movable axially relative thereto, one of said shafts being adjustable toward and from the other, an axle on which said one shaft is rotatably mounted, said axle being coaxial with said one shaft and having axially spaced gears disposed at its opposite ends, gear members with which said gears mesh, means for rotating said axle to effect said adjustment, and means for maintaining pressure between said friction discs in any adjusted position of said shafts.

10. An adjustable ratio friction transmission comprising two coaxial shafts, a pair of coaxial countershafts parallel to said coaxial shafts, two sets of tapered friction discs mounted on said two coaxial shafts, respectively, to rotate therewith and to be movable axially thereof, two mating sets of friction discs mounted on the two countershafts, respectively, to rotate therewith and to be movable axially thereof, a torque loader interposed between the two sets of friction discs of the countershafts, means for adjusting the countershafts toward and from the first two coaxial shafts, and means for moving the friction discs axially upon said adjustment, said last-named means comprising anti-friction rolling means bearing at a plurality of points, whose surface normals are inclined to each other, against the end disc of one set of countershaft friction discs, a holder for said rolling means, a housing enclosing said friction discs and shafts, spaced parallel ways provided in said housing and inclined both to said shafts and to the direction of said adjustment, rollers mounted on said holder and engaging said ways, means for holding the holder on said ways during said adjustment, and means for transmitting axial pressure between said housing and the end disc of said other set of said countershaft friction discs.

11. An adjustable ratio friction transmission comprising two coaxial shafts, a pair of coaxial countershafts parallel to said two coaxial shafts, two sets of tapered friction discs mounted on said coaxial shafts, respectively, to rotate therewith and to be movable axially relative thereto, two mating sets of friction discs mounted on the two countershafts, respectively, to rotate therewith and to be movable axially relative thereto, a torque-loader interposed between the two sets of friction discs of the countershafts, means for adjusting the countershafts toward and from the first two shafts, and means for moving the friction discs axially upon said adjustment, said last-named means comprising a roller shaped to contact the end disc of one set of countershaft friction discs along two lines inclined to one another, a holder on which said roller is rotatably mounted, a housing enclosing said friction discs and shafts, a way in said housing extending along the plane of the axes of said shafts and at an acute angle to said axes, rollers for guiding said holder along said way, means for transmitting axial pressure between said housing and the end disc of said other set of countershaft friction discs.

12. An adjustable ratio friction transmission comprising two coaxial shafts, a pair of coaxial countershafts parallel to said two coaxial shafts, two sets of tapered friction discs mounted on said coaxial shafts, respectively, to rotate therewith and to be movable axially relative thereto, two mating sets of friction discs mounted on the two countershafts, respectively, to rotate therewith and to be movable axially relative thereto, a torque-loader interposed between the two sets of friction discs of the countershafts, means for adjusting the countershafts toward and from the first two shafts, and means for moving the friction discs axially upon said adjustment, said last-named means comprising a roller shaped to contact the end disc of one set of countershaft friction discs along two lines inclined to one another, a holder on which said roller is rotatably mounted, a housing enclosing said friction discs and shafts, a way in said housing extending along the plane of the axes of said shafts and at an acute angle to said axes, rollers for guiding said holder along said way, the axis of the first named roller being parallel to said way, means for transmitting axial pressure between said housing and the end disc of the other set of countershaft friction discs.

13. An adjustable ratio friction transmission comprising two coaxial shafts, a pair of coaxial countershafts parallel to said two coaxial shafts, two sets of tapered friction discs mounted on said two coaxial shafts, respectively, to rotate therewith and to be movable axially relative thereto, two mating sets of friction discs mounted on the two countershafts, respectively, to rotate therewith and to be movable axially relative thereto, a torque-loader interposed between the two sets of friction discs of the countershafts, means for adjusting the countershafts toward and from the first two shafts, and means for moving the friction discs axially upon said adjustment, said last-named means comprising a holder, an anti-friction bearing capable of carrying axial and radial loads, one race of which is secured to the end disc of one set of countershaft discs and the other race of which is secured to said holder, a housing enclosing said shafts and friction discs, a stationary way in said housing extending along the plane of the axes of the shafts at an acute angle to said axes, means for guiding said holder along said way, and means for transmitting axial pressure between said housing and the end disc of the other set of said countershaft friction discs.

14. An adjustable ratio friction transmission comprising two coaxial shafts, two coaxial countershafts extending parallel to the first two coaxial shafts, a set of tapered friction discs mounted on each of the first two shafts to rotate therewith and to be movable axially relative thereto, two sets of mating friction discs mounted on the two countershafts respectively, to rotate therewith and to be movable axially relative thereto, a torque-loader interposed between the two sets of friction discs of the countershafts, means for adjusting the countershafts toward and from the first two shafts, and means for moving the friction discs axially upon said adjustment, said last-named means comprising a roller having two peripheral surfaces whose profiles are inclined to one another and which have line contact with surfaces formed on one end disc of one set of countershaft discs, a holder on which said roller is rotatably mounted, a housing enclosing said friction discs and shafts, a way in said housing extending along the plane of the axes of said shafts at an acute angle to said axes, means for guiding said holder on said way, means for transmitting axial pressure between said housing and the end disc of the other set of said countershaft friction discs.

15. An adjustable ratio friction transmission comprising two parallel shafts, one of which is adjustable radially toward and from the other, two sets of inter-engaging tapered friction discs mounted on said shafts for rotation therewith and axial displacement thereon, a housing enclosing said shafts and discs, and means for moving said discs axially upon radial adjustment of said one shaft, said last-named means comprising a holder, an anti-friction bearing capable of carrying axial and radial loads, one race of which is secured to one end disc of the radially adjustable set of discs and the other race of which is secured to said holder, a stationary way in said housing extending along the plane of the axes of said shafts at an acute angle to said axes, means for guiding said holder along said way, and means for transmitting axial pressure between said housing and the other end disc of the radially adjustable set of discs.

16. An adjustable ratio friction transmission comprising two parallel shafts, one of which is adjustable toward and from the other, two sets of inter-engaging friction discs mounted on said shafts for rotation therewith and axial displacement relative thereto, each of said discs having working surfaces at opposite sides so shaped that the axial spacing of the inter-engaging discs changes upon adjustment of said one shaft, one of said shafts, at least, being externally splined, and each disc of the set of friction discs, which is mounted on said splined shaft, having a central hub which is formed with splines that inter-engage with the splines of said splined shaft, the individual splines of each said disc projecting laterally beyond the working surfaces of the disc to provide extended axial support for each said disc, each spline of each said disc projecting to one side only of a disc and adjacent splines of each said disc projecting to opposite sides of the disc and adjacent discs being so mounted angularly on said splined shaft that their splines engage in alternate spline grooves, respectively, of said splined shaft.

17. An adjustable ratio friction transmission comprising two parallel shafts, one of which is adjustable toward and from the other, two sets of inter-engaging friction discs mounted on said shafts for rotation therewith and axial displacement relative thereto, each of said discs having working surfaces at opposite sides so shaped that the axial spacing of the inter-engaging discs changes upon adjustment of said one shaft, one of said shafts, at least, being externally splined, and each disc of the set of friction discs, which is mounted on said splined shaft, having a central hub which is formed with splines that engage the spline grooves of said splined shaft, the individual splines of each said disc projecting laterally beyond the working surfaces of the disc to provide extended axial support for each said disc, and each said disc having splines which project laterally beyond opposite sides of the disc, adjacent such discs being so mounted angularly on said splined shaft that their splines engage in alternate grooves, respectively, of said splined shaft.

18. An adjustable ratio friction transmission comprising two parallel shafts, one of which is adjustable toward and from the other, two sets of inter-engaging friction discs mounted on said shafts for rotation therewith and axial displacement relative thereto, each of said discs having working surfaces at opposite sides so shaped that the axial spacing of the inter-engaging discs changes upon adjustment of said one shaft, one of said shafts, at least, being externally splined, and each disc of the set of friction discs, which is mounted on said splined shaft, having a central hub which is formed with splines that engage the spline grooves of said splined shaft, the individual splines of each said disc projecting laterally beyond the working surfaces of the disc to provide extended axial support for each said disc, and each said disc having splines which project laterally beyond opposite sides of the disc, each said disc having only half as many splines as there are spline grooves in said splined shaft, and adjacent said discs being so mounted angularly on said splined shaft that their splines engage in alternate grooves, respectively, of said splined shaft.

ERNEST WILDHABER.

REFERENCES CITED

The following references are of record in the file of this patent:

UNITED STATES PATENTS

| Number | Name | Date |
|---|---|---|
| 877,491 | Dill | Jan. 28, 1908 |
| 929,405 | Dill | July 27, 1909 |
| 948,091 | Geer | Feb. 1, 1910 |
| 1,017,877 | Landis | Feb. 20, 1912 |
| 1,017,893 | Landis | Feb. 20, 1912 |
| 1,718,267 | Whittle | June 25, 1929 |
| 1,790,737 | Alborn | Feb. 3, 1931 |
| 2,038,554 | Edgar | Apr. 28, 1936 |
| 2,222,281 | Beier | Nov. 19, 1940 |